(12) United States Patent
Gupta et al.

(10) Patent No.: US 10,970,209 B2
(45) Date of Patent: Apr. 6, 2021

(54) DESTAGING METADATA TRACKS FROM CACHE

(71) Applicant: International Business Machines Corporation, Armonk, NY (US)

(72) Inventors: Lokesh M. Gupta, Tucson, AZ (US); Kevin J. Ash, Tucson, AZ (US); Kyler A. Anderson, Sahuarita, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 16/351,507

(22) Filed: Mar. 12, 2019

(65) Prior Publication Data

US 2020/0293447 A1    Sep. 17, 2020

(51) Int. Cl.
*G06F 12/0804* (2016.01)
*G06F 12/123* (2016.01)

(52) U.S. Cl.
CPC ........ *G06F 12/0804* (2013.01); *G06F 12/123* (2013.01); *G06F 2212/1044* (2013.01); *G06F 2212/608* (2013.01)

(58) Field of Classification Search
None
See application file for complete search history.

(56) References Cited

U.S. PATENT DOCUMENTS

| 2014/0136790 | A1 | 5/2014 | Beardsley et al. |
| 2017/0091109 | A1* | 3/2017 | Ash ..................... G06F 11/1076 |
| 2017/0351619 | A1 | 12/2017 | Ash et al. |
| 2018/0095888 | A1 | 4/2018 | Ash et al. |

* cited by examiner

*Primary Examiner* — Charles J Choi
(74) *Attorney, Agent, or Firm* — Konrad Raynes Davda & Victor LLP; David W. Victor

(57) ABSTRACT

Provided are a computer program product, system, and method for destaging metadata tracks from cache A counter for a metadata track is updated in response to modifying the metadata track in the cache, wherein there are counters for metadata tracks in the cache. The metadata track is destaged from the cache in response to the counter for the metadata track being less than a threshold value. The counter for the metadata track is decremented based on a number of modified metadata tracks in the cache.

20 Claims, 5 Drawing Sheets

Metadata Cache Control Block

Metadata Cache Management Information

DESTAGING METADATA TRACKS FROM CACHE

BACKGROUND OF THE INVENTION

1. Field of the Invention

The present invention relates to a computer program product, system, and method for destaging metadata tracks from cache.

2. Description of the Related Art

A cache management system buffers tracks in a storage device recently accessed as a result of read and write operations in a faster access storage device, such as memory, than the storage device storing the requested tracks. Cached tracks may comprise metadata tracks having information on one or more customer data tracks in the cache, that may indicate a track format and layout of the track, also known as a track format descriptor (TFD), that is needed to process the data in the tracks in the cache. When processing a track in the cache, the metadata track needs to be read from storage, stored in the cache, and processed to determine the track format and layout to use to process requests to the customer track in the cache. A metadata track may have metadata for numerous consecutive customer tracks in the storage. If a customer track needs to be processed and the metadata track is not in the cache, then the metadata track for that customer data track needs to be staged into cache.

To avoid the cache from becoming full, modified metadata tracks need to be destaged to storage, i.e., copied from cache to storage. To remove metadata tracks from cache, a destage cache scan may periodically run, to destage modified metadata tracks.

There is a need in the art for improved techniques for destaging metadata tracks from the cache.

SUMMARY

Provided are a computer program product, system, and method for destaging metadata tracks from cache A counter for a metadata track is updated in response to modifying the metadata track in the cache, wherein there are counters for metadata tracks in the cache. The metadata track is destaged from the cache in response to the counter for the metadata track being less than a threshold value. The counter for the metadata track is decremented based on a number of modified metadata tracks in the cache.

DETAILED DESCRIPTION

During error handling behavior (EHB), such as failover, failback, warmstart, all modified tracks and their metadata tracks need to be processed to destage from cache to storage. A presence of an excessive number of modified metadata tracks in cache may substantially increase the EHB completion time. Further, during a periodic safe data commit scan during normal operations, modified tracks and their metadata tracks are destaged from cache to storage. The presence of an excessive number of modified metadata tracks in cache may cause spikes of increased disk activity to destage the numerous modified metadata tracks, which spikes read and write response times, negatively impacting system performance.

Described embodiments provide improvements to computer technology for destaging tracks from cache by maintaining a counter of updates to each metadata track so that metadata tracks having relatively lower number of updates, i.e., less frequently accessed, are preferred to destage. This improves system performance because destaging relatively frequently accessed metadata tracks negatively impacts performance because frequently accessed metadata tracks have a higher likelihood of future accesses, which would require the destaged modified metadata tracks to be staged back into cache for likely future access. Further, described embodiments improve destaging performance by decrementing the counter for each metadata track based on the number of modified tracks in the cache to decrement by a greater amount if the number of modified metadata tracks is relatively high to increase the likelihood of destaging the modified metadata tracks by decrementing their update counters by a relatively higher value. Further, to the extent the number of modified metadata tracks is relatively low, the update counter for the modified metadata tracks is decremented by a smaller amount to reduce the likelihood of destaging modified metadata tracks from cache to conserve system resources when there is less of a need to destage modified metadata tracks as the current number is not excessive.

Figure 1:
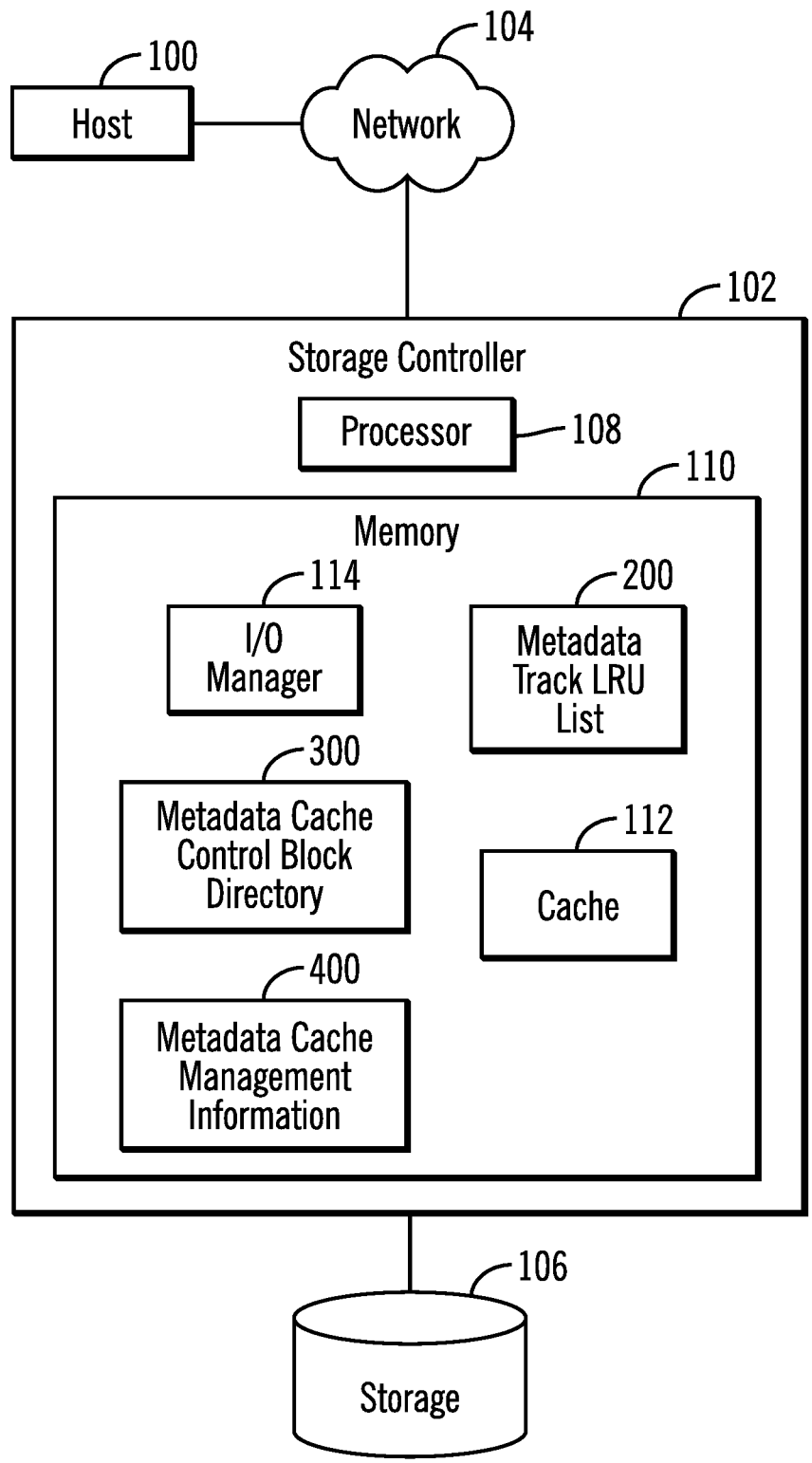
FIG. 1 illustrates an embodiment of a storage environment.

FIG. 1 illustrates an embodiment of a data storage environment having one or more host systems 100 connected to a storage controller 102 over a network 104. The storage controller 102 manages access to tracks configured in a storage 106. The storage 106 may comprise a volume or any other unit of configured storage. The storage controller 102 includes one or more processors 108 and a memory 110, including a cache 112 to cache customer data tracks and metadata tracks providing information on the customer data tracks that are stored in the storage 106. The processor 108 may comprise a separate central processing unit (CPU), one or a group of multiple cores on a single CPU, or a group of processing resources on one or more CPUs. The cache 112 buffers data transferred between the hosts 100 and the storage 106, as well as metadata tracks having layout and other information needed to process the cached customer tracks being processed.

The memory 110 includes an Input/Output (I/O) manager 114 for managing the caching of metadata tracks in the cache 112 and the transfer of tracks between the hosts 100 and the storage 106 in the cache 112. A customer data track and metadata track may comprise any unit of data configured in the storage 106, such as a track, Logical Block Address (LBA), storage cell, group of cells (e.g., column, row or array of cells), sector, segment, etc., which may be part of a larger grouping of tracks, such as a volume, logical device, etc.

The memory 110 includes a metadata track Least Recently Used (LRU) list 200 comprising an ordered list of metadata tracks in the cache 112, having a most recently used (MRU) end at which a metadata track is added to the cache 112 and a least recently used (LRU) end of an oldest metadata track in the cache, from which metadata tracks are removed, e.g., destaged from the cache 112. An accessed metadata track in the LRU list 200 may be moved to the MRU end. The memory 110 includes a metadata cache control block directory 300 having cache control blocks, where there is one cache control block for each metadata track in the cache 112 and metadata cache management information 400 having information used to determine whether to destage metadata tracks from the cache 112.

The storage 106 may comprise volumes configured in Logical Subsystems (LSS), where each LSS is comprised of multiple volumes. The term volume as used herein may refer to other types of storage units comprising addressable ranges of data, such as logical devices, logical drives, partitions, etc. A track comprises any addressable storage unit representing data in storage and memory, also referred to as a block, logical address, logical block address (LBA), physical block address, etc.

The storage controller 102 may comprise an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world).

The network 104 may comprise a Storage Area Network (SAN), Local Area Network (LAN), Intranet, the Internet, Wide Area Network (WAN), peer-to-peer network, wireless network, arbitrated loop network, etc.

The storage 106 may be implemented in one or more storage devices, or an array of storage devices, may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices in the storage 106 may comprise heterogeneous storage devices from different vendors and different types of storage devices, such as a first type of storage devices, e.g., hard disk drives, that have a slower data transfer rate than a second type of storage devices, e.g., SSDs.

The memory 110 may comprise a suitable volatile or non-volatile memory for storing storage controller 102 data and programs.

The I/O manager 114 may comprise program code loaded into memory and executed by a processor. Alternatively, some or all of the functions may be implemented in hardware devices, such as in Application Specific Integrated Circuits (ASICs), Field Programmable Gate Arrays (FPGAs) or executed by separate dedicated processors.

Figure 2:
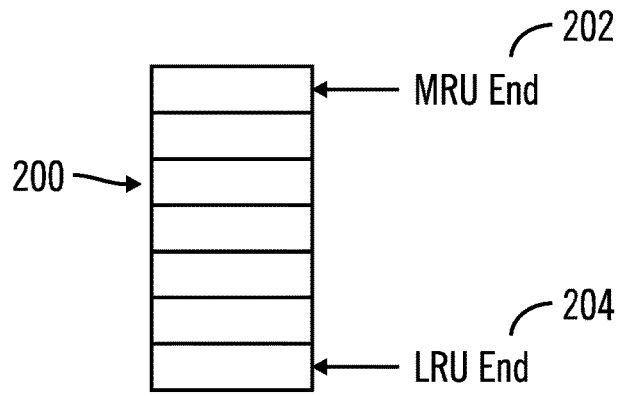
FIG. 2 illustrates an embodiment of a Least Recently Used (LRU) cache management list as known in the prior art.

FIG. 2 illustrates an embodiment of the metadata cache LRU list 200 as known in the prior art, having a most recently used (MRU) end 202 identifying a metadata track most recently added to the cache 112 or most recently modified in the cache 112 and a least recently used (LRU) end 204 from which a metadata track identified at the LRU end 204 is selected to destage from the cache 112. The LRU end 204 identifies a modified metadata track that has been in the cache 112 the longest. As a track is indicated in the MRU end 202, other tracks move downward toward the LRU end 204. If there is not sufficient space in the cache 112 for the metadata track being added to the MRU end 202, then a modified track indicated at the LRU end 204 may be destaged from the cache 112 to make room for the new metadata track being added.

Figure 3:
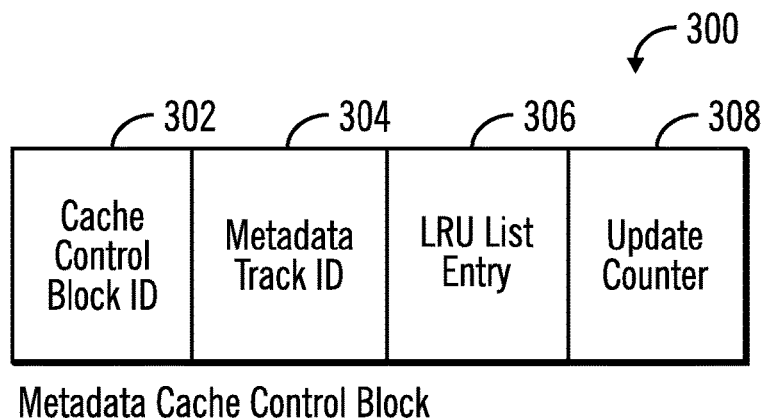
FIG. 3 illustrates an embodiment of a metadata cache control block.

FIG. 3 illustrates an embodiment of an instance of a metadata cache control block $300_i$ in the metadata cache control block directory 300 for one of the metadata tracks in the cache 112, including, but not limited to, a cache control block identifier 302, such as an index value of the cache control block $300k$; a metadata track identifier (ID) 304 identifying the metadata track; an LRU list entry 306 indicating an entry in the LRU list 200 indicating metadata track 304; and an update counter 308 indicating a number of times the metadata track has been modified while in the cache 112.

Figure 4:
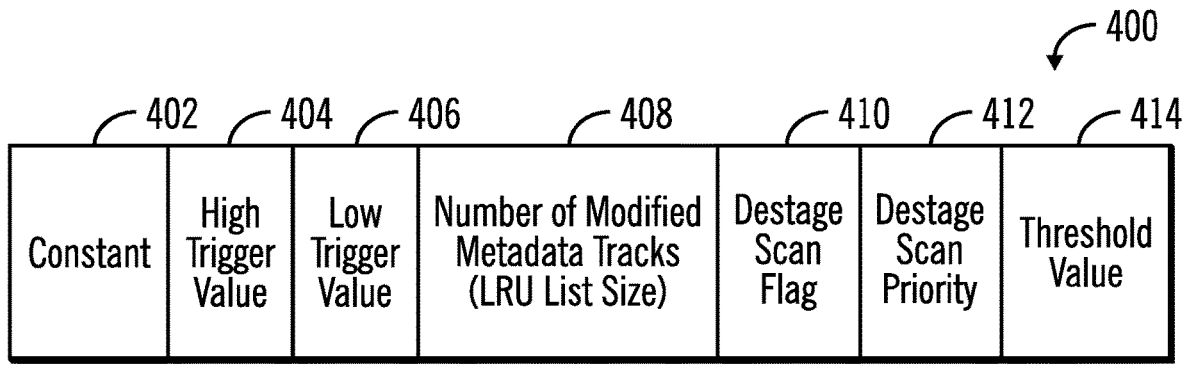
FIG. 4 illustrates an embodiment of metadata cache management information.

FIG. 4 illustrates an embodiment of metadata cache management information 400, including a constant 402 used to adjust the update counter 308, which may comprise an average of the counters 308 for all the modified metadata tracks in the cache 112; a high trigger value 404 indicating a number of modified metadata tracks in the cache 112 at which destage scanning is performed with high priority, such as additional task control blocks assigned to perform high priority destage scanning; a low trigger value 406 indicating a number of modified metadata tracks in the cache 112 at which destage scanning is performed with normal priority; a number of modified metadata tracks 408 in the cache 112, which may comprise the LRU list 200 size; a destage scan flag 410 indicating whether destage scan operations for metadata tracks are to be performed; a destage scan priority 412 indicating whether metadata tracks are to be destaged with normal or high priority; and a threshold value 414 indicating a threshold of the counter value 308 at which a metadata track is to be destaged. The constant 402 and the threshold value 414 may comprise different values or a same value.

Figure 5:
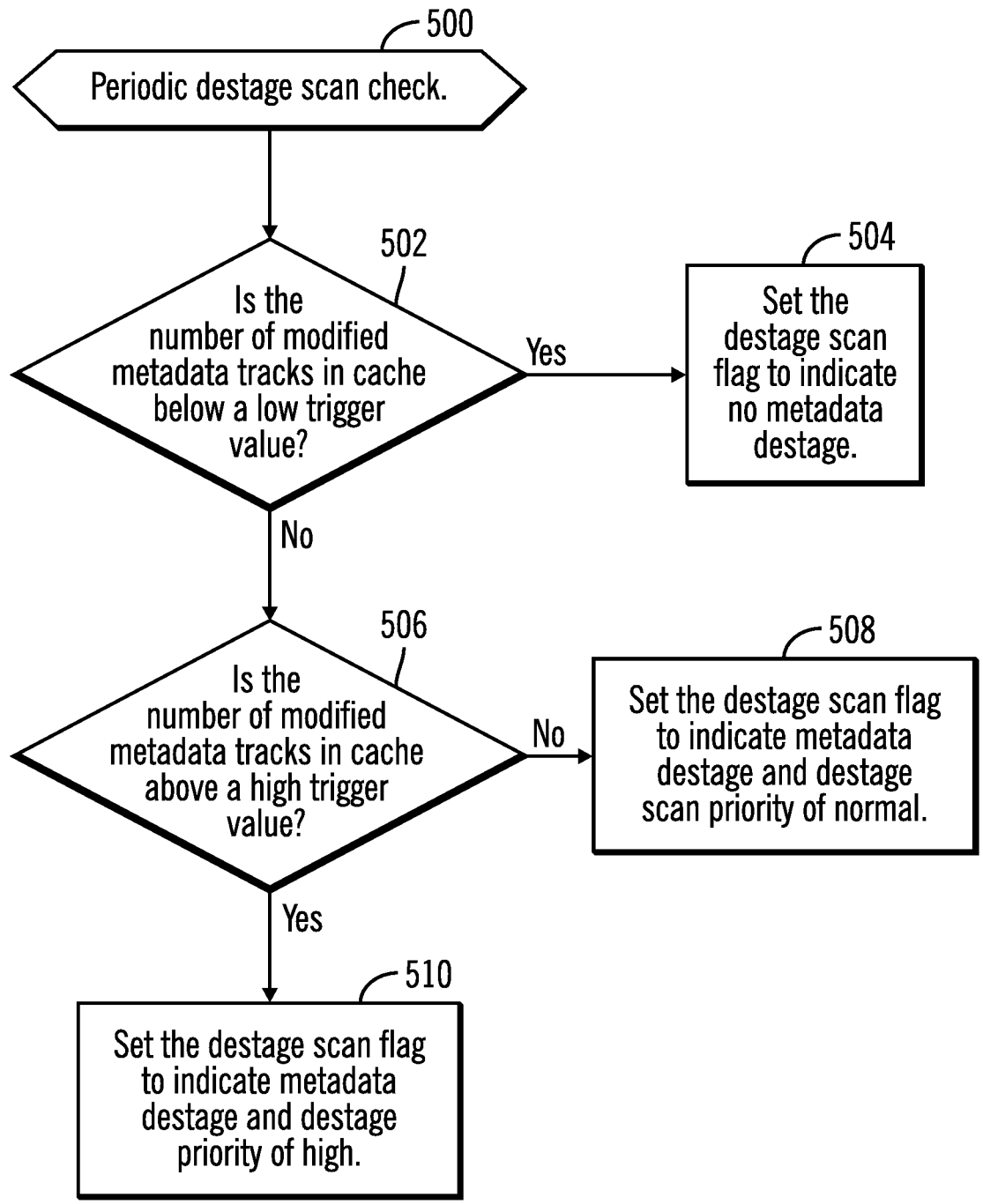
FIG. 5 illustrates an embodiment of operations to determine whether to initiate destaging of modified metadata tracks from cache.

FIG. 5 illustrates an embodiment of operations performed by the I/O manager 114 to determine whether to initiate destage scan operations to destage metadata tracks from the cache 112. Upon performing (at block 500) a periodic destage scan check, if (at block 502) the number of modified metadata tracks 408 is less than the low trigger value 406, then the destage scan flag 410 is set to indicate no metadata track destaging. If (at block 502) the number of modified metadata tracks 408 is greater than the low trigger value 406 and if (at block 506) less than a high trigger value 404, then the destage scan flag 410 is set (at block 508) to indicate a metadata track destage and the destage scan priority 412 is set to normal priority to cause a normal level of tasks to be assigned to perform the destage scan of metadata tracks. If (at block 506) the number of modified metadata tracks 408 is greater than the high trigger value 404, then the destage scan flag 410 is set (at block 510) to indicate a metadata track destage and the destage scan priority 412 is set to high priority to cause a high priority level of tasks to be assigned to perform the destage scan of metadata tracks.

With the embodiment of FIG. 5, the I/O manager 114 determines to perform destage scan operations if the number of modified metadata tracks exceed a low threshold value to reduce the number of metadata tracks to avoid having to devote excessive time to destage modified metadata tracks if the system has to undergo error handling behavior (EHB), such as a failover, failback and warmstart. The number of modified metadata tracks 408 in the cache 112 is preferably kept at a level such that in the event of having to destage the modified metadata tracks due to error handling behavior, the destaging operation will not cause undue delays to the error handling operation to allow the system to restart. Further, if the number of modified metadata tracks is determined to be particularly excessive, such as above the high trigger value 404, then more resources are devoted to destaging modified metadata tracks to maintain the number of modified metadata tracks in cache 112 at a level that will not cause undue delays in the event of error handling behavior.

Figure 6:
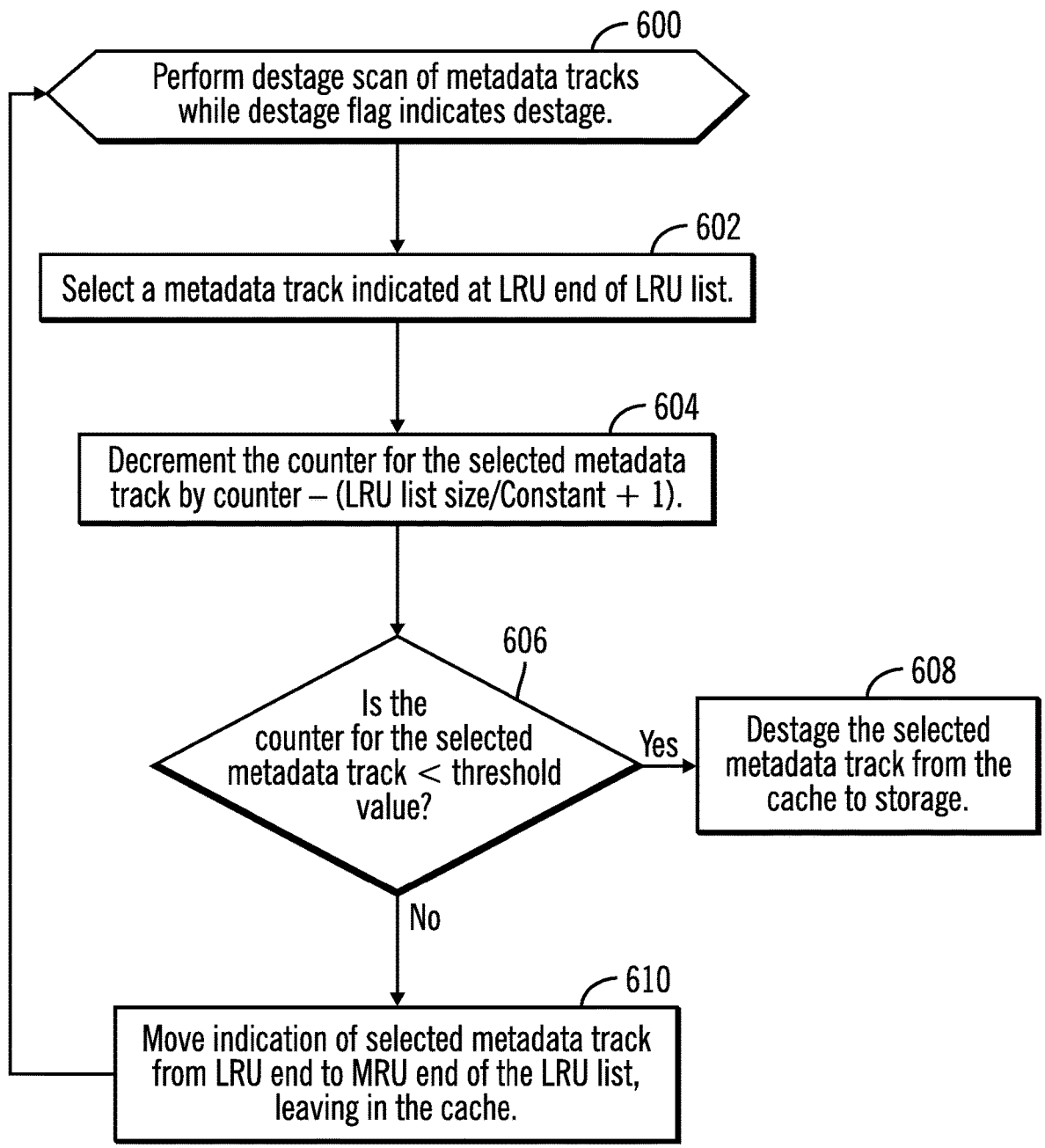
FIG. 6 illustrates an embodiment of operations to determine whether to destage a modified metadata track from cache.

FIG. 6 illustrates an embodiment of operations to determine whether to destage a modified metadata track indicated at the LRU end 204 of the LRU list 200 during destage scan operations. While the destage scan flag 410 indicates to perform destage scan operations (at block 600), a metadata track is selected (at block 602) indicated at the LRU end 204 of the LRU list 200. The updated counter 308 in the cache control block $300_i$ for the selected metadata track is decremented (at block 604) by a value related to the number of modified tracks 408 in the cache 112. In one embodiment, the update counter 308 may be decremented by the ((LRU list size 408 divided by a constant 402) plus 1). The constant 402 may comprise a value such as an average of all update counters 308 for all modified metadata tracks in the cache 112. In this way, the update counter is decremented by a greater number as the number of modified metadata tracks in the cache 112 increase.

If (at block 606) the update counter 308 for the selected metadata track is less than the threshold value 414, then the selected metadata track is destaged (at block 608) to the storage 106. If (at block 606) the update counter 308 for the selected metadata track is greater than the threshold value 414, then indication of the selected metadata track is moved (at block 610) from the LRU end 204 of the LRU list 200 to the MRU end 202.

With the embodiment of FIG. 6, tracks having a lower update counter 308 value, i.e., having been modified less frequently, are more likely to be destaged, e.g., be below the threshold value 414, than tracks having a higher update counter 308, which have been modified more frequently. This improves cache performance because frequently modified metadata tracks are more likely to be required for future track accesses and thus destaging such frequently modified metadata tracks from cache 112 will harm system performance because such destaged frequently modified tracks will have to again be staged back from storage 106 into cache 112, requiring disk access, when the metadata track is again needed to process a frequently accessed customer track. Further, the rate at which the update counter is decremented is based on the number of modified metadata tracks 408 in the cache 112. The greater the number of modified metadata tracks in the cache 112, the greater the value used to decrement the counter 308, such as (LRU list size 408/constant 402) plus 1. In this way, increases in the number of modified metadata tracks in the cache 112 decrements the counter 308 at a higher rate to increase the likelihood the counter 308 is less than the threshold value 414 and will be destaged. To the extent the number of modified metadata tracks 408 in the cache 112 is decreasing, the lower the rate at which the counter 308 is decremented, which decreases the likelihood the counter 308 falls below the threshold value 414 and is destaged, which is warranted given the number of modified metadata tracks is at a lower level.

In the embodiment of FIG. 6, the counter 308 is decremented at block 604 before the counter 308 is compared to the threshold value 414 at block 606 to determine to destage. In an alternative embodiment, the counter 308 may be decremented after comparing to the threshold value 414 (at block 606) and determining whether to destage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
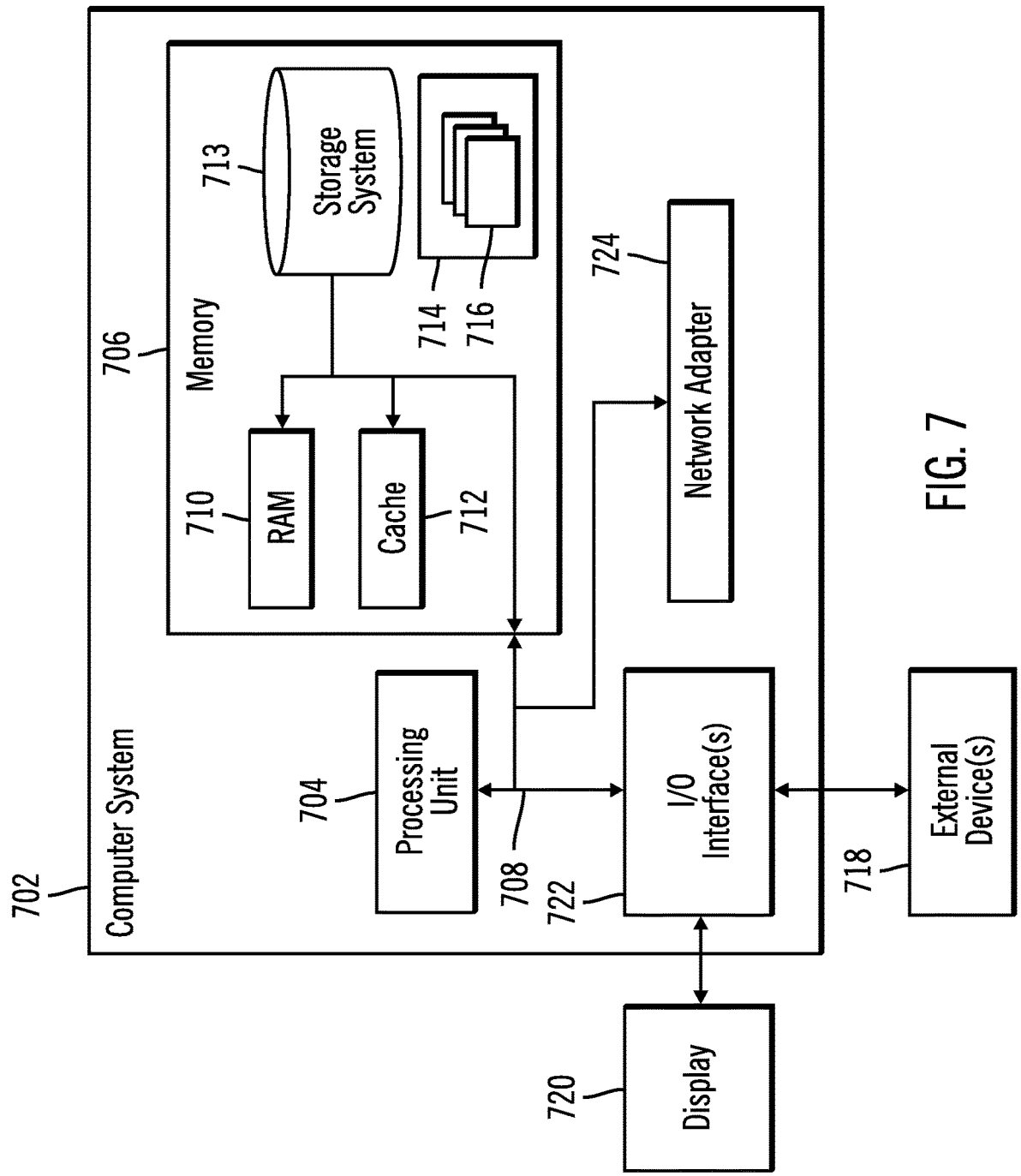
FIG. 7 illustrates a computing environment in which the components of FIG. 1 may be implemented.

The computational components of FIG. 1, including the host 100 and storage controller 102 may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for destaging modified metadata tracks in cache to storage, wherein the computer program product comprises a computer readable storage medium having program instructions embodied therewith that when executed by a processor cause operations, the operations comprising:
   updating a counter for a metadata track in response to modifying the metadata track in the cache, wherein there are counters for metadata tracks in the cache;
   destaging the metadata track from the cache in response to the counter for the metadata track being less than a threshold value; and
   decrementing the counter for the metadata track by an amount that increases as a number of modified metadata tracks in the cache increases.

2. The computer program product of claim 1, wherein the counter for the metadata track is decremented before determining whether to destage the metadata track in response to the counter being less than the threshold value.

3. The computer program product of claim 1, wherein the decrementing the counter comprises decrementing the counter by ((the number of modified metadata tracks divided by a constant) plus one).

4. The computer program product or claim 3, wherein the constant comprises an average of counters for all the modified metadata tracks in the cache.

5. The computer program product of claim 3, wherein the counter and the threshold value comprise different values.

6. The computer program product of claim 1, wherein the operations further comprise:
   maintaining a least recently used (LRU) list having a most recently used (MRU) end and an LRU end;
   adding indication of the metadata track in the cache to the MRU end of the LRU list in response to modifying the metadata track; and
   selecting the metadata track to consider for destaging from the LRU end of the LRU list, wherein the destaging the metadata track and decrementing the counter are performed for the selected metadata track.

7. The computer program product of claim 6, wherein the operations further comprise:
   moving indication of the selected metadata track from the LRU end to the MRU end in response to the counter for the selected metadata track being greater than the threshold value.

8. The computer program product of claim 1, wherein the operations further comprise:
   determining whether the number of modified metadata tracks exceeds a trigger value, wherein metadata tracks are selected to consider for destaging in response to the number of modified metadata tracks exceeding the trigger value, wherein metadata tracks are not selected for destaging in response to the number of modified metadata tracks being below the trigger value.

9. A system for destaging modified metadata tracks in cache to storage, comprising:
a processor; and
a computer readable storage medium having program instructions that when executed by the processor cause operations, the operations comprising:
updating a counter for a metadata track in response to modifying the metadata track in the cache, wherein there are counters for metadata tracks in the cache;
destaging the metadata track from the cache in response to the counter for the metadata track being less than a threshold value; and
decrementing the counter for the metadata track by an amount that increases as a number of modified metadata tracks in the cache increases.

10. The system of claim 9, wherein the decrementing the counter comprises decrementing the counter by ((the number of modified metadata tracks divided by a constant) plus one).

11. The system of claim 10, wherein the constant comprises an average of counters for all the modified metadata tracks in the cache.

12. The system of claim 9, wherein the operations further comprise:
maintaining a least recently used (LRU) list having a most recently used (MRU) end and an LRU end;
adding indication of the metadata track in the cache to the MRU end of the LRU list in response to modifying the metadata track; and
selecting the metadata track to consider for destaging from the LRU end of the LRU list, wherein the destaging the metadata track and decrementing the counter are performed for the selected metadata track.

13. The system of claim 12, wherein the operations further comprise:
moving indication of the selected metadata track from the LRU end to the MRU end in response to the counter for the selected metadata track being greater than the threshold value.

14. The system of claim 9, wherein the operations further comprise:
determining whether the number of modified metadata tracks exceeds a trigger value, wherein metadata tracks are selected to consider for destaging in response to the number of modified metadata tracks exceeding the trigger value, wherein metadata tracks are not selected for destaging in response to the number of modified metadata tracks being below the trigger value.

15. A method for destaging modified metadata tracks in cache to storage, comprising:
updating a counter for a metadata track in response to modifying the metadata track in the cache, wherein there are counters for metadata tracks in the cache;
destaging the metadata track from the cache in response to the counter for the metadata track being less than a threshold value; and
decrementing the counter for the metadata track by an amount that increases as a number of modified metadata tracks in the cache increases.

16. The method of claim 15, wherein the decrementing the counter comprises decrementing the counter by ((the number of modified metadata tracks divided by a constant) plus one).

17. The method of claim 16, wherein the constant comprises an average of counters for all the modified metadata tracks in the cache.

18. The method of claim 15, further comprising:
maintaining a least recently used (LRU) list having a most recently used (MRU) end and an LRU end;
adding indication of the metadata track in the cache to the MRU end of the LRU list in response to modifying the metadata track; and
selecting the metadata track to consider for destaging from the LRU end of the LRU list, wherein the destaging the metadata track and decrementing the counter are performed for the selected metadata track.

19. The method of claim 18, further comprising:
moving indication of the selected metadata track from the LRU end to the MRU end in response to the counter for the selected metadata track being greater than the threshold value.

20. The method of claim 15, further comprising:
determining whether the number of modified metadata tracks exceeds a trigger value, wherein metadata tracks are selected to consider for destaging in response to the number of modified metadata tracks exceeding the trigger value, wherein metadata tracks are not selected for destaging in response to the number of modified metadata tracks being below the trigger value.

\* \* \* \* \*